United States Patent [19]

Sato et al.

[11] 4,370,396
[45] Jan. 25, 1983

[54] PROCESS FOR PRODUCING COLOR FILTER PLATES

[75] Inventors: Masamichi Sato; Kenji Matsumoto, both of Asaka; Shunichi Naito, Saitama, all of Japan

[73] Assignees: Fuji Photo Film Co., Ltd., Kanagawa; Fuji Photo Optical Co., Ltd., Saitama, both of Japan

[21] Appl. No.: 235,228

[22] Filed: Feb. 17, 1981

[30] Foreign Application Priority Data

Feb. 15, 1980 [JP] Japan .................................. 55/18091

[51] Int. Cl.³ ............................................... G03C 7/00
[52] U.S. Cl. ......................................... 430/7; 430/27; 430/326; 430/329; 430/376; 430/383
[58] Field of Search ...................... 430/7, 27, 943, 326, 430/329, 357, 366, 376, 383

[56] References Cited

U.S. PATENT DOCUMENTS

| 2,494,068 | 1/1950 | Speck | 430/326 |
| 4,236,098 | 11/1980 | Horak et al. | 430/7 |
| 4,271,246 | 6/1981 | Sato et al. | 430/7 |

Primary Examiner—J. Travis Brown
Attorney, Agent, or Firm—Sughrue, Mion, Zinn, Macpeak & Seas

[57] ABSTRACT

A process for producing a color filter plate is described, which comprises
forming a color filter pattern on a silver halide emulsion layer of a photographic material comprising a transparent support with the emulsion layer thereon, while the emulsion layer of areas to be removed is subjected to imagewise exposure, development and an etch-bleaching treatment to remove the emulsion layer of the areas,
adhering a transparent plate to the emulsion layer, and
abrading thereafter either the transparent support or the transparent plate to a desired thickness.

6 Claims, 8 Drawing Figures

PROCESS FOR PRODUCING COLOR FILTER PLATES

FIELD OF THE INVENTION

The present invention relates to a process for producing color filter plates and particularly to a process for producing color filter plates for color television camera tubes.

BACKGROUND OF THE INVENTION

Recently, bi-tubular or mono-tubular type color television camera tubes have been developed as components for prior multi-tubular type color television camera tubes. An example of these types of television camera tubes is a multicolor optical filter plate which comprises an optically abraded glass disk plate, a filter comprising multicolor stripes containing organic dyes or a cross pattern of striped filter elements formed on the glass disk plate and a glass thin layer having a thickness of about 10 to 30 μm formed thereon. A transparent electrode layer and a photoconductive layer for picking up color signals passing through the filter are provided in a body on the thin glass layer of this multicolor optical filter plate to form a face plate for the color television tube. The multicolor optical filter conventionally used here is one wherein three colors consisting of red, green and blue or cyan, magenta and yellow are regularly arranged. But the color composition thereof is not limited to the above described three colors, and there are those having two colors or four or more colors.

The most conventional process for producing color filter plates for color television camera tubes is described in the following. This process is illustrated with reference to FIG. 1 which shows the structure of the prior multicolor optical filter plate for color television camera tubes. A multicolor optical filter layer 11 is formed on an optically abraded glass disk plate 10 by, for example, the following process. After a thin glass plate 13 is adhered to the layer 11 with an adhesive 12, the thin glass plate 13 is abraded to be even thinner (to a thickness of about 10 to 30 μm or so) to produce a multicolor optical filter plate. On the thin glass plate of the resulting filter plate, a transparent electrode layer and a photoconductive layer are provided by, for example, vacuum evaporation to produce a face plate for the color television camera tube. The reason why the thin glass plate is provided between the multicolor optical filter layer 11 and the transparent electrode layer is as follows. Namely, where the multicolor optical filter layer 11 contains organic dyes, it is necessary to prevent the influence caused by generation of a gas deleterious in taking a picture from the filter layer, when the transparent electrode layer and the photoconductive layer are deposited by vacuum evaporation or the resulting face plate for the color television camera tube is used. Further, the reason why the thickness of the thin glass plate is reduced by abrading is to prevent formation of dim images as far as possible where rays passing through the color filter are focused on the photoconductive layer.

However, inevitably the color filter plate thus obtained becomes naturally expensive because the steps for forming a desired pattern on the color filter layer is very complicated. Namely, known color filters are those using a dichroic film (an interference membrane process) as described in, for example, Japanese Patent Publication No. 8590/65 and Japanese Patent Application (OPI) No. 3440/77 (the term "OPI" as used herein refers to a "published unexamined Japanese patent application") and those prepared by dyeing a high molecular weight material layer with dyes (a dyeing process) as described in, for example, Japanese Patent Application (OPI) Nos. 37237/72, 63739/73 and 66853/73 and Japanese Patent Publication No. 248/78. However, the processes for producing them are very complicated and troublesome, because they require the steps of pattern formation including coating of a photoresist, imagewise exposure with precise arrangement of a mask, development, coloration or bleaching and removal of the resist, etc., for every color, and these steps must be repeatedly carried out many times (generally 3 times or more).

Some of the present inventors have developed various processes for producing color filter patterns in a simple manner using a silver halide emulsion as a material for forming a filter layer. One of these processes is that described in U.S. Pat. No. 4,271,246. This process comprises, as essential steps, carrying out a pattern exposure for the first color of a black-white silver halide emulsion layer in a photographic material comprising a support and at least one black-white silver halide emulsion layer provided on the support, forming a pattern containing a dye of the first color by color development with a developer containing a color coupler, carrying out a pattern exposure for the second color of the unexposed part containing silver halide, forming a pattern containing a dye of the second color by color development with a developer containing a color coupler, and, if necessary, repeating the same steps for forming a pattern containing a dye of third or subsequent colors, to form an image composed of at least two colors, and removing silver after the final color development to produce a multicolor optical filter. Further, if a silver halide emulsion is used as a material for forming the filter layer, it is possible to adopt any process for development which has been used for color photography.

When the silver halide emulsion is used as the material for forming the filter layer, not only can color filters be produced less expensively as compared with the above described prior interference membrane process or dyeing process but also there is the following advantage. Namely, the silver halide emulsion is not formed on a disk plate for the television camera tube but is applied to a thin plate of glass, etc., which is sufficiently larger than the disk plate, and a plurality of color filters is then formed at the same time on a single glass plate by the above described process. The glass plate is then cut to have each individual color filter thereon and is adhered to each glass disk plate. Since a plurality of color filters is formed at the same time on a single glass plate as described above, it becomes possible to obtain a number of color filters at the same time. Further, if a defective filter is produced therein, the filter only needs to be discarded. Accordingly, the cost per filter plate becomes remarkably low in forming the filter on an expensive optically abraded glass disk plate, because the step of reproducing the glass disk plate can be omitted where defective filters are formed.

It has, however, been found that the following disadvantage occurs when the color filter plate is produced by a process which comprises forming a color filter pattern on a silver halide emulsion layer provided on a transparent support of glass, etc., adhering a transparent plate of glass, etc., thereto with an adhesive (after the transparent support has been cut into each filter part where a plurality of patterns is formed on the transparent support such as a thin glass plate, etc., which is sufficiently larger than the glass disk plate), and thereafter reducing the thickness of the transparent plate or the transparent support by abrasion. Namely, in reducing the thickness of the above described transparent plate or the transparent support by abrasion, the abrasion is generally carried out in the presence of water. In such case, water permeates at the edges of the emulsion layer placed between the transparent plate and the transparent support and the binder (generally gelatin) of the emulsion layer swells, by which the edges of the transparent plate or the transparent support are broken due to the force of expansion during abrading when the transparent plate or the transparent support becomes thin as abrasion progresses. Although this damage of the edges of the transparent plate or the transparent support does not directly influence the color filter pattern area, the organic material (gelatin) is exposed at the broken areas and, consequently, difficulty in vacuum sealing occurs, because there is the possibility of generation of noxious gas from the filter layer when the transparent electrode layer and the photoconductive layer are deposited by vacuum evaporation or the resulting face plate for the color television camera tube is used.

SUMMARY OF THE INVENTION

Accordingly, an object of the present invention is to provide a process for producing inexpensive color filter plates.

Another object of the present invention is to provide a process for producing color filter plates using a color filter obtained using a silver halide photographic material, which does not have the above described disadvantages in producing, for example, a color filter plate for color television camera tubes.

Namely, the objects of the present invention are attained by a process for producing color filter plates which comprises:

forming a color filter pattern on a silver halide emulsion layer of a photographic material comprising a transparent support and the silver halide emulsion layer thereon, while the emulsion layer of areas to be removed is subjected to imagewise exposure, development and an etch-bleach treatment to remove the emulsion layer of these areas, adhering a transparent plate to the emulsion layer, and abrading thereafter either the transparent support or the transparent plate to a desired thickness.

Figure 1:
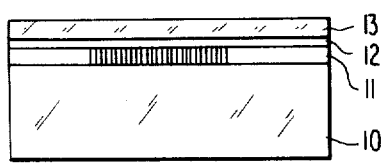
FIG. 1 is a sectional view which shows the prior color filter plate.

In these figures, reference numeral 20 is a transparent support, 21 and 28 each is a silver halide emulsion layer, 27 is a silver image area, 22 is a color filter pattern, 23 is an adhesive layer, and 24 and 24' each is a transparent plate.

DETAILED DESCRIPTION OF THE INVENTION

The present invention is illustrated below in greater detail by reference to the drawings.

Figure 2:

FIGS. 2 to 7 are plans of each step illustrating in turn the process of the present invention. In FIG. 2, 20 is a transparent support of glass, etc., and 21 is a silver halide emulsion layer applied thereto.

Examples of silver halide emulsions which can be coated on the transparent support, directly or through a subbing layer, include known silver halide emulsions obtained by dispersing silver halide in an aqueous binder, but fine-grained emulsions are particularly preferred in the present invention. For example, the so-called Lippmann emulsion having an average silver halide grain size of 0.1 $\mu$m or less is preferred for use. The ratio by weight of the silver halide to the water-soluble binder is in the range of about 1:6 to 8:1. Exemplary silver halides are silver chloride, silver bromide, silver iodide, silver chlorobromide, silver iodobromide, silver chloroiodide and silver chloroiodobromide, etc. Typical water-soluble binders are gelatin, albumin, casein, cellulose derivatives, agar, sodium alginate, sugar derivatives, polyvinyl alcohol, polyvinylpyrrolidone, polyacrylamide and the like. If desired, a compatible mixture of two or more of these binders may be used. The silver halide emulsion layer 21 preferably has a dry thickness of about 0.8 to about 10 $\mu$m.

The subbing layer used, as the occasion demands, in the present invention is a layer of a material which exhibits firm adhesion to both of the support 20 and the silver halide emulsion layer 21. Materials which can be used for the subbing layer are gelatin, albumin, casein, cellulose derivatives, starch derivatives, sodium alginate, polyvinyl alcohol, polyvinylpyrrolidone, acrylic acid copolymers and polyacrylamide, etc. The subbing layer preferably has a thickness as thin as possible, and the thickness thereof is in the range of 0.01 to 1 $\mu$m and preferably 0.05 to 0.5 $\mu$m.

If desired, an antihalation back layer may be provided on the back of the support of the resulting photographic material.

Figure 3:
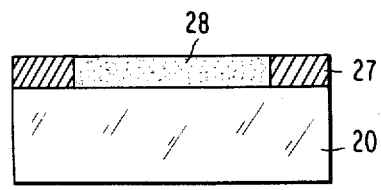
Figure 4:
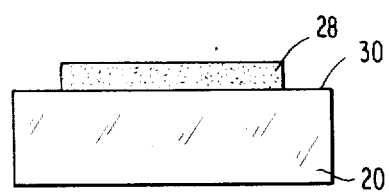

The emulsion layer corresponding to the edges of the transparent support or the transparent plate to be bonded to the photographic material (unnecessary emulsion layer which gives rise to difficulties in the following steps) is removed from the photographic material, as shown in FIGS. 3 and 4. Firstly, as shown in FIG. 3, the areas from which the emulsion is removed are subjected to pattern exposure and development (but not fixing) to form a silver pattern 27. 28 is a non-exposed area where silver halide remains. Then, as shown in FIG. 4, the photographic material in which the silver pattern 27 was formed is subjected to an etch-bleach treatment to remove the emulsion layer of the areas where the silver pattern is present. 30 is the area where the emulsion layer was removed by such a treatment. Suitable developing agents for forming the silver pattern 27 are those well-known in the art, which include, for example, hydroquinone, pyrogallol, 1-phenyl-3-pyrazolidone, p-aminophenol and ascorbic acid, etc.

If desired, known compounds or compositions, such as an alkali agent (for example, sodium hydroxide or sodium carbonate), a pH controlling or buffering agent (for example, acetic acid or boric acid), an antifogging agent (for example, potassium bromide) or a preservative (for example, sodium sulfite), etc., can be added to the developing solution.

The etch-bleaching is a phenomenon where the silver image area of the emulsion layer falls off when the emulsion layer having the silver image is processed with an etch-bleaching solution.

Known etch-bleaching solutions can be used, and examples are, for example, those described in *TAGA Proceedings*, pages 1–11 (1967), and *PSA Technical Quarterly*, Nov. 1955, pages 130–134. Specific examples include an aqueous solution containing cupric chloride, citric acid and hydrogen peroxide, an aqueous solution containing copper nitrate, potassium bromide, lactic acid and hydrogen peroxide, an aqueous solution containing ferric nitrate, potassium bromide, lactic acid and hydrogen peroxide, an aqueous solution containing ferric nitrate, potassium bromide and lactic acid and an aqueous solution containing stannic chloride and potassium bromide, etc.

Techniques for removing the unnecessary emulsion layer on the transparent support or of the edges of the transparent plate to be bonded to the photographic material include a process for mechanically removing the emulsion layer other than the above described process. However, the process of the present invention is very simple, and it is particularly preferred where a plurality of color filters is formed on a large area transparent support and the transparent support is then cut to contain each filter.

Figure 5:
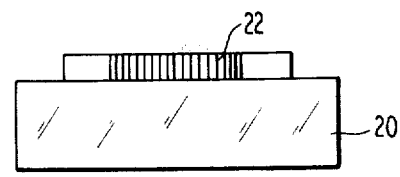
FIGS. 2 to 7 are sectional views which show each step of the process of the present invention.

FIG. 5 shows the state where a color filter pattern 22 is formed on the silver halide emulsion layer 28 of the photographic material, from which the unnecessary emulsion layer of the edges on the support was removed, by pattern exposure and development. As the process for forming such a color filter pattern 22, it is possible to utilize known color photographic techniques in addition to the process which comprises repeating development using developers containing color couplers, each with a different color coupler, as shown in the above described U.S. Pat. No. 4,271,246.

Figure 6:
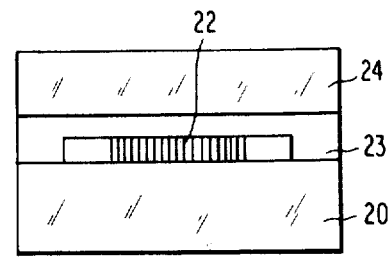

FIG. 6 shows the state where a transparent plate 24 of glass, etc., is adhered to the color filter plate obtained as shown in FIG. 5 using an adhesive layer 23. The color filter layer 22 is bonded to face the transparent plate (the adhesive layer side). For the adhesive layer, suitable adhesives can be used and, for example, an epoxy adhesive can be used.

Figure 7:
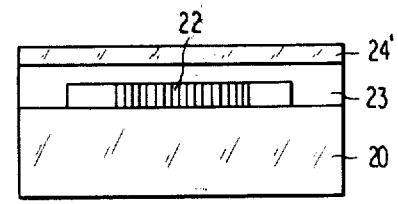

FIG. 7 shows the state where the transparent plate 24 of FIG. 6 is abraded to the desired thickness (for example, about 10 to 30 μm), wherein 24' is the transparent plate after abrasion. Where a plurality of color filters is formed on a large area transparent support 20 and the transparent support is cut to form each color filter which is then adhered to an optically abraded transparent plate 24 such as a glass disk plate, etc., the transparent support must be sufficiently abraded, and it is necessary for the surface of the transparent support 20 or the transparent plate 24 which faces thereafter the photoconductive layer is sufficiently abraded. Further, it is, of course, preferred to abrade the face of the side to be exposed to incident light to remove harmful scratches or smears, etc.

Figure 8:
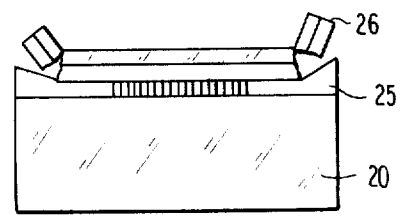
FIG. 8 is a sectional view which shows a step where the process of the present invention was not practiced.

In the color filter plates obtained according to the present invention, since the edges of the emulsion layer placed between the transparent support 20 and the transparent plate 24 are removed and filled with the adhesive layer 23, the edges of the abraded transparent plate are not broken in the abrasion step for the transpatent support 20 or the transparent plate 24 or the abrasion step for the transparent support 20 and the transparent plate 24 which is generally carried out in the presence of water. This is unlike the case shown in FIG. 8 wherein the binder (generally gelatin) in the edges 25 of the emulsion layer swells during abrasion to break the edges 26 of the thin abraded transparent plate.

On the abraded surface of the resulting color filter plate, a transparent electrode layer and a photoconductive layer are provided in a suitable manner, for example, by vacuum evaporation, etc., to obtain a face plate for a color television tube.

In another embodiment of the present invention, the color filter plates may be produced as follows. Namely, a color filter pattern having at least one color is formed on the silver halide emulsion layer 28, while a color filter pattern having another color is formed on the transparent plate 24 using a known interference filter or dye filter. They are then bonded together using an adhesive to face each other, and they are thereafter abraded.

Further, in the above described process, although the unnecessary emulsion layer is removed by the etch-bleach treatment prior to formation of the color filter pattern, this etch-bleach treatment may be carried out at any time if it is carried out prior to the step of bonding to the transparent plate 24. Of course, it may be carried out after formation of the color filter pattern or during formation of the color filter pattern.

As described above, according to the present invention, it is possible to produce inexpensive color filter plates using a silver halide emulsion layer as a filter layer. Further, advantageously the transparent support of glass, etc., or the transparent plate does not break during the abrading step.

While the invention has been described in detail and with reference to specific embodiments thereof, it will be apparent to one skilled in the art that various changes and modifications can be made therein without departing from the spirit and scope thereof.

What is claimed is:

1. A process for producing a color filter plate which comprises
   forming a color filter pattern on a silver halide emulsion layer of a photographic material comprising a transparent support with emulsion layer thereon, while the emulsion layer of areas to be removed is subjected to imagewise exposure, development and an etch-bleaching treatment to remove the emulsion layer of said areas,
   adhering a transparent plate to said emulsion layer, and
   abrading thereafter either the transparent support or the transparent plate to a desired thickness,
   wherein said formation of a color filter pattern on a silver halide emulsion is performed by a process which comprises carrying out a pattern exposure for the first color of a black-white silver halide emulsion layer in a photographic material comprising a support and at least one black-white silver halide emulsion layer provided on the support, forming a pattern containing a dye of the first color by color development with a developer containing a color coupler, carrying out a pattern exposure for the second color of the unexposed part containing silver halide, forming a pattern containing a dye of the second color by color developement with a developer containing a color coupler, and optionally repeating the same steps forming a pattern containing a dye of subsequent colors, to form an image composed of at least two colors, and removing silver after the final color development.

2. A process of claim 1, wherein said etch-bleaching treatment is carried out with an aqueous solution containing cupric chloride, citric acid and hydrogen peroxide, an aqueous solution containing copper nitrate, potassium bromide, lactic acid and hydrogen peroxide, an aqueous solution containing ferric nitrate, potassium bromide, lactic acid and hydrogen peroxide, an aqueous solution containing ferric nitrate, potassium bromide and lactic acid, or an aqueous solution containing stannic chloride and potassium bromide.

3. A process of claim 1, wherein said adhering is carried out with an epoxy adhesive.

4. A process of claim 1 wherein the transparent support or the transparent plate is abraded to a thickness of about 10 to 30 μm.

5. A process of claim 1, wherein an interference filter or dye filter having a color filter pattern of at least one color is provided on said transparent plate, followed by adhering to said emulsion layer such that the interference filter or dye filter and the emulsion layer face each other.

6. A process of claim 1, wherein color filter patterns of at least two colors are formed on said silver halide emulsion layer.

* * * * *